United States Patent [19]

Hedgcoxe et al.

[11] Patent Number: 4,862,808

[45] Date of Patent: Sep. 5, 1989

[54] ROBOTIC PIPE CRAWLING DEVICE

[75] Inventors: Pat G. Hedgcoxe, Fort Worth; Charles D. Zinsmeyer, Austin, both of Tex.

[73] Assignee: Gas Research Institute, Chicago, Ill.

[21] Appl. No.: 237,533

[22] Filed: Aug. 29, 1988

[51] Int. Cl.$^4$ .............................................. B61B 13/10
[52] U.S. Cl. .................................. 104/138.2; 105/365; 378/60
[58] Field of Search .................... 104/138.1, 138.2; 15/104.05; 105/365; 118/DIG. 10; 378/60

[56] References Cited

U.S. PATENT DOCUMENTS

| | | | |
|---|---|---|---|
| 2,604,521 | 6/1948 | Boucher | 104/138.2 X |
| 4,112,850 | 9/1978 | Sigel-Gfeller | 15/104.05 X |
| 4,244,296 | 1/1981 | Vertut | 15/104.05 X |
| 4,526,106 | 7/1985 | Okada et al. | 378/60 X |
| 4,537,136 | 8/1985 | Douglas | 378/60 X |
| 4,563,954 | 1/1986 | Okada et al. | 104/138.2 |
| 4,654,702 | 3/1987 | Tolino et al. | 104/138.2 X |

Primary Examiner—Robert B. Reeves
Assistant Examiner—Dean J. Kramer
Attorney, Agent, or Firm—Neal J. Mosely

[57] ABSTRACT

A robotic pipe crawling device comprises two three-wheel modules pivotally connected at their centers, each having one idler wheel and two driven wheels. Each module comprises an idler yoke and a driveline yoke chassis with parallel laterally spaced rectangular side plates, the idler side plates being pinned at one end to the chassis and the idler wheel mounted on the other end. The driveline side plates are pinned to the chassis and the drive wheels are rotatably mounted one at each end. A motor at each end of the chassis pivots the wheeled modules independently into and out of a wheel engaging position on the interior of the pipe and a drive motor carried by the driveline yoke drives the two drive wheels in opposite directions to propel the device. A motor mounted within each idler yoke allows them to pivot independently of the driveline yokes. A swivel joint in the chassis midsection allows each end to rotate relative to the other. The chassis may be extended with additional driveline yokes. In addition to a straight traverse, the device is capable of executing a "role sequence" to change its orientation about its longitudinal axis, and "L", "T", and "Y" cornering sequences. Connected with a computer the device can "learn" a series of axis control sequences after being driven through the maneuvers manually.

40 Claims, 5 Drawing Sheets

ROBOTIC PIPE CRAWLING DEVICE

BACKGROUND OF THE INVENTION

1. Field of the Invention

This invention relates generally to pipe crawling apparatus, and more particularly to a robotic pipe crawling device capable of choosing its own path in a pipe maze.

2. Brief Description of the Prior Art

The efficient and safe operation of the underground natural gas piping system is a continuing concern of the gas utility industry. Methods presently used by gas companies to locate, inspect, and repair damaged or leaking buried gas pipes are for the most part imprecise, time consuming, and costly. The basic process involves locating the defective pipe and exact area of the pipe in need of maintenance, pavement removal, site excavation, pipe repair or replacement, and site restoration. Two major time, cost, and safety factors in this maintenance process are the difficulties in precisely locating the pipe and the specific pipe section in need of repair, and the potential for hazards and expenses to the utility and community from damaged or leaking pipe that goes undetected.

Equipment and techniques commonly used to locate these pipe leaks and defects includes electronic pipe locators, pipe tagging systems, combustible gas locators, and if such equipment does not provide the desired information, full excavation of the pipe. Even with the use of pipe and gas detectors, there is the possibility that after an excavator has uncovered a buried gas pipe to repair a leak, he may find that due to false detector readings, the section of exposed pipe is not leaking, or that the site of the excavation does not contain the pipe at all.

The potential danger from leaking underground gas pipe which escapes detection, and the cost to the gas industry for lost gas and unnecessary excavations, as well as excavations for the purposes of inspection, is significant. There is therefore a need to develop a system that could investigate the condition of underground gas mains and services from within the pipe, locate the exact position of both the pipe and the detected defect, and reduce the need for soil excavation and site restoration.

Self propelled devices which move through pipelines are known in the art. There are several patents which disclose self propelled devices of various constructions that are used inside pipelines.

Boucher, U.S. Patent No. 2,604,521 discloses a conduit tractor comprising a frame, three wheels arranged on opposite ends of the frame which are spaced uniformly apart about the longitudinal axis and a jack screw pantograph mechanism for adjusting one of the wheels relative to the axis. Two of the wheels are driven by an electric motor through a chain and sprocket arrangement.

Sigel-Gfeller, U.S. Pat. No. 4,112,850 discloses a conveyor apparatus having a driving chassis section and a driven chassis section with a pair of endless belts connecting the chassis sections and maintained in contact with the interior wall of the pipeline.

Vertut, U.S. Pat. No. 4,244,296 discloses a self-propelled vehicle with articulated arms having a body with at least one driving and guide wheel which bears on the pipeline interior surface and at least two pivoting arms articulated on the body and which have bearing members on the ends. The bearing members roll or slide on the surface opposite the guide wheel. The device also transmits a pivoting torque to the arms in such a way that the arms, by reaction, apply the driving wheel against the surface.

Okada et al, U.S. Pat. No. 4,526,106 discloses a motor driven vehicle comprising a pair of arms pivoted to each other at one pair of ends, a drive wheel coincident with the pivot, a swiveling wheel carried at the other end of each arm, and a spring positioned to pull the arms toward each other so that the dimension of the vehicle across the pipe is maximized.

Douglas, U.S. Pat. No. 4,537,136 discloses a pipeline vehicle having front and rear sets of wheels carried on sprung arms. Each wheel can be locked by a clutch. One set of wheels is locked while a ram is operated, causing the other set of wheels to roll forward. The main body of the vehicle can be rotated relative to the wheels by a motor operating via a drive belt. The interior of the body is pressurized with inert gas exhausted from the propulsion system which is vented by a one-way valve.

Okada et al, U.S. Pat. No. 4,563,954 discloses a motor driven vehicle comprising a pair of two-wheel trucks each pivotally connected to an end of a stretcher member which urges the trucks away from each other. Each truck has a driving wheel and a swiveling wheel.

Tolino et al, U.S. Patent discloses a portable and collapsible pipe crawler which includes a four-wheeled chassis with the sets of wheels along the opposite sides of the chassis being respectively driven by two hydraulic motors. A foldable mast pivotally connected to the chassis carries a pneumatic cylinder which forces bearing wheels against the opposite side of the pipe to force the chassis wheels into firm frictional engagement with the pipe interior. The chassis also carries a three-axis remote manipulator and one or two remotely controlled video cameras. A position indicator including a star wheel and proximity sensor is disposed for rolling engagement with the pipe to sense distance travelled.

The present invention is distinguished over the prior art in general, and these patents in particular by a robotic pipe crawling device having two three-wheel modules pivotally connected at each end of a chassis, with each module having one idler wheel and two driven wheels. Each module is formed of an idler yoke and a driveline yoke constructed of parallel laterally spaced rectangular side plates. The idler yoke is pinned at one end to the chassis and the idler wheel is rotatably mounted at the outer end. The driveline yoke is pinned intermediate its ends to the chassis and the drive wheels are rotatably mounted one at each end. A pivot motor at each end of the chassis pivots the wheeled modules independently into and out of a wheel engaging position on the interior surface of the pipe and a drive motor carried by the driveline yoke drives the two drive wheels in opposite directions to propel the device through the pipe interior. A second pivot motor mounted within each idler yoke allows the idler yokes to pivot independently of the driveline yokes. A swivel joint in the chassis midsection allows each end of the chassis to be rotated about the longitudinal axis relative to one another. The chassis may be extended by adding additional driveline yokes. In addition to a straight traverse the device is capable of executing a "role sequence" to change its orientation about its longitudinal axis, and "L", "T", and "Y" cornering sequences. Connected with a computer the device is capable of "learning" a series of axis control sequences after being driven through the maneuvers in a manually operated mode, thus choose its own path through pipe maze.

SUMMARY OF THE INVENTION

It is therefore an object of the present invention to provide a robotic pipe crawling device having module pivot flexibility which enables the device to negotiate corners with complete autonomy.

It is another object of this invention to provide a robotic pipe crawling device which is very stable in rotation about its longitudinal axis and exhibits little or no tendency to corkscrew when traversing the pipe interior.

Another object of this invention is to provide a robotic pipe crawling device having a narrow profile when viewed end-on and open frame construction to limit the restriction to flow of pipe contents.

Another object of this invention is to provide a robotic pipe crawling device having a narrow profile when viewed end-on profile sufficient to pass through plug valves.

Another object of this invention is to provide a robotic pipe crawling device capable of being oriented such that its plane is perpendicular to gravity, whereby debris, mud, and water up to one third the pipe diameter can be passed over safely.

Another object of this invention is to provide a robotic pipe crawling device of modular construction thus enabling expedient assembly, removal, and replacement of damaged or worn parts.

Another object of this invention is to provide a robotic pipe crawling device which is easily extendible by adding additional modules and allows additional mounting space for on board electronics and sensors.

Another object of this invention is to provide a robotic pipe crawling device having a swivel connection between the end modules which enables the modules to be rotated about the longitudinal axis relative to one another to place the lead module in position for continued translation into the corner and beyond.

Another object of this invention is to provide a robotic pipe crawling device which will investigate the condition of underground gas mains and services from within the pipe, locate the exact position of both the pipe and any detected defect, and reduce the need for oil excavation and site restoration.

A further object of this invention is to provide a robotic pipe crawling device which will navigate the interior of buried piping systems and allow nondestructive investigation of underground piping not known to have problems.

A still further object of this invention is to provide a robotic pipe crawling device which is simple in construction, economical to manufacture, and is rugged and reliable in operation.

Other objects of the invention will become apparent from time to time throughout the specification and claims as hereinafter related.

The above noted objects and other objects of the invention are accomplished by a robotic pipe crawling device having two or more three-wheel modules pivotally connected at each ends of one or more chassis, with each module having one idler wheel and two driven wheels. Each module is formed of an idler yoke and a driveline yoke constructed of parallel laterally spaced rectangular side plates. The driveline yoke is pinned intermediate its ends to the chassis and the drive wheels are rotatably mounted one at each end. A pivot motor at each end of the chassis pivots the wheeled modules independently into and out of a wheel engaging position on the interior surface of the pipe and a drive motor carried by the driveline yoke drives the two drive wheels in opposite directions to propel the device through the pipe interior. A second pivot motor mounted within each idler yoke allows the idler yokes to pivot independently of the driveline yokes. A swivel joint in the chassis midsection allows each end of the chassis to be rotated about the longitudinal axis relative to one another In addition to a straight traverse the device is capable of executing a "role sequence" to change its orientation about its longitudinal axis, and "L", "T", and "Y" cornering sequences. Connected with a computer the device is capable of "learning" a series of axis control sequences after being driven through the maneuvers in a manually operated mode.

DESCRIPTION OF A PREFERRED EMBODIMENT

In the following description, a first embodiment is described and shown in simplified form for an understanding of the basic features of the invention and its operation, then a second embodiment having the same basic principles of operation will be described and shown in more detail.

Referring to the drawings by numerals of reference, there is shown schematically in FIGS. 1, 2, 3, and 4, a preferred robotic pipe crawling device 10 inside a pipe P. Robotic crawling device 10 comprises a rectangular chassis 11 having a lead drive module 12 pivotally connected to the forward end, and a trailing drive module 13 pivotally connected to the rearward end. The drive modules 12 and 13 each comprise an idler yoke 14 and a driveline yoke 15.

Idler yoke 14 and driveline yoke 15 are formed of parallel laterally spaced rectangular side plates 16 and 17, respectively. Idler side plates 16 are pinned at one end to chassis 11 and driveline side plates 17 are pinned intermediate their ends to the chassis. An idler wheel 18 is rotatably mounted on an axle at the outer end of each idler yoke 14 and a pair of driveline wheels 19 are rotatably mounted on axles one at each end of the driveline yoke 15. As shown by arrows in FIG. 1, idler yoke 14 and driveline yoke 15 pivot independently of each other about the axis of the pivot connection relative to chassis 11.

Figure 1:
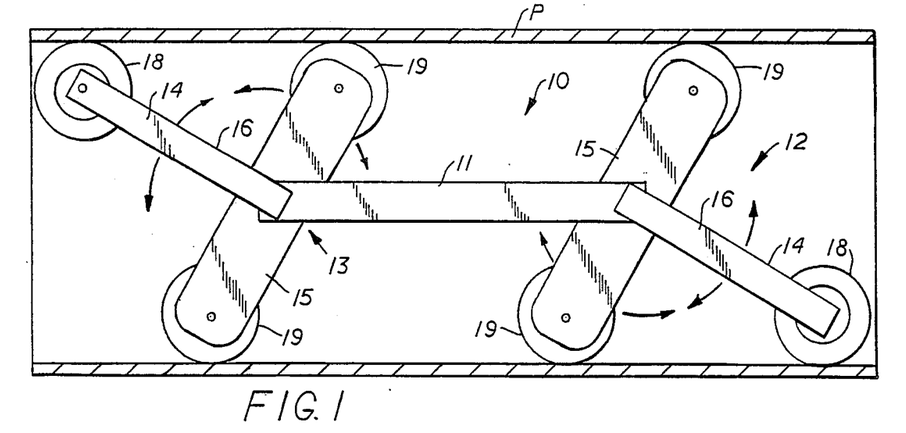
FIG. 1 is a side elevation of a robotic pipe crawling device illustrating a preferred embodiment of this invention.
Figures 2, 3:
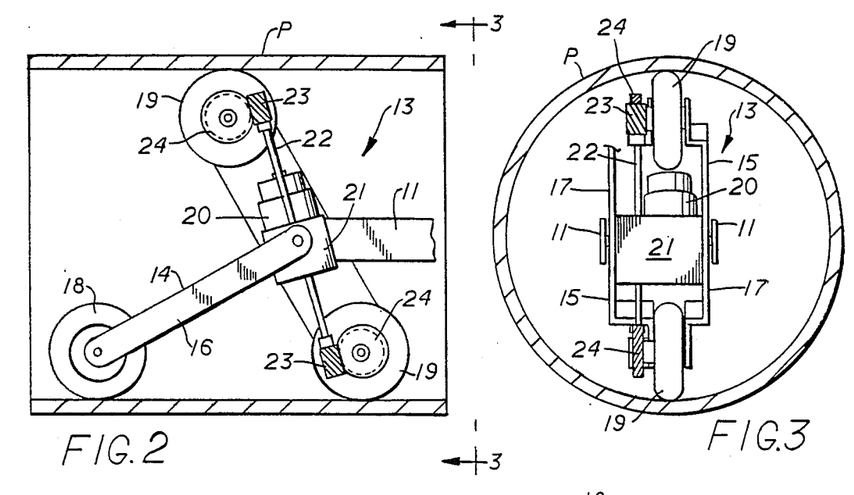
FIG. 2 is a detail view of one of the drive units of the robotic pipe crawling device of FIG. 1.
FIG. 3 is a sectional view taken on the line 3—3 of FIG. 2.

FIG. 2 illustrates the robot with the outer side plates of driveline yoke 15 removed to show schematically the internal configuration of one end module. A drive motor 20, such as a permanent magnet DC induction motor, is mounted on gearbox 21 within the driveline yoke 15 between side plates 17 and an elongate rod 22 is rotatably mounted in the gearbox with each end extending outwardly therefrom with a worm gear 23 at each end operatively connected to a worm wheel gear or pinion gear 24 secured to each drive wheel 19. Drive wheels 19 rotate in opposite directions but at the same speed. Drive motor 20 may operate through a gear box and several stages of gearing. The gear ratio is further increased through the worm and worm wheel set at the robot drive wheels.

Tire composition is of key importance to the overall device performance. One preferred tire material is Neoprene, because of its low coefficient of friction. As a result, real time control of motor velocity is not required during cornering maneuvers. Instead, the motors are simply driven directly at a constant speed while the tires are allowed to slip as needed to accommodate differences in front and rear module forward velocities. This contributes to robot simplicity. Another tire characteristic is high compliance which enables a relatively wide tolerance in robot arm placement while maintaining adequate footprint area and normal force for the high traction requirements of vertical climbing.

The axial distance from the pivot connection to the axle of idler wheel 18 is greater than the axial distance between the axles of drive wheels 19. Robot 10 is very stable in rotation about its longitudinal axis. In other words, because the idler wheel stance is much greater than the drive wheel stance, the robot is stable and exhibits little or no tendency to corkscrew when traversing the pipe. As seen in FIG. 3, robot 10 has a narrow end profile and an open frame structure limiting the restriction to flow through the pipe P. In addition to offering limited restriction to flow, the narrow end-on profile gives the robot the ability to pass through plug valves. By orienting the robot so that its plane is perpendicular to gravity, debris, mud, and water up to one third the pipe diameter can be passed over safely.

OPERATION

In operation, the operator positions and secures the driveline and idler yokes 15 and 14 manually at the appropriate angles to insure sufficient normal or gripping force for power transmission and gripping the pipe side wall.

While traveling in a straight section of pipe, the robot joints are in the following positions. Nominally, idler yokes 14 are at a 90° angle with respect to the driveline yokes 15. The lead and trailing modules 12 and 13 are positioned so that the respective lead and trailing idler yokes are opposite, i.e., if the lead idler yoke is high when viewing the robot from the side, then the trailing idler yoke will be low. It should be noted that the robot is fully capable of straight section traverse when both modules are positioned with both idlers high or both low. However, testing has proven that the up/down configuration is optimum.

As the device 10 approaches a 90° corner (FIG. 4), it must already have the idler yoke of lead module 12 "pointed" in the direction of the impending turn. With this sole precondition satisfied, the robot proceeds to the corner until idler tire 18 contacts the inner surface of the outside wall of the impending turn. On contact with the outside wall, lead module 12 then begins to pivot upward while the module center axis continues forward progress. The forward progress of the lead module 12 center continues until the outside drive tire contacts the inside surface of the outside wall of the turn. At this point, lead module 12 has rotated 30° in the direction of the upward turn and lead idler tire 18 and lead outside drive tire 19 are both in contact with the inside surface of the outside wall of the turn.

Figure 4:
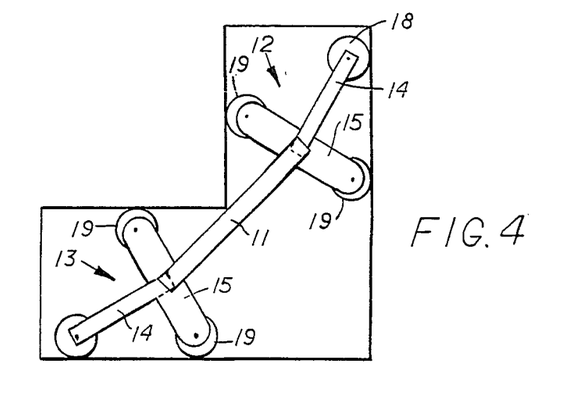
FIG. 4 is a schematic view of the robotic pipe crawling device negotiating a 90° turn in a pipe.

With trailing module 13 still in the original configuration and providing forward thrust (and therefore the normal force required for traction of the lead module drive tire 19), lead module 12 begins to traverse the straight section of pipe following the 90° turn. After a short distance, lead module drive tire 19 on the inside of the turn engages the inside surface of the inside wall of the pipe. At this point lead module 12 resumes pulling its own weight (FIG. 4). Trailing module 13 continues its forward progress until drive tire 19 on the inside of the turn breaks contact with the inside surface of the turn at the 90° break. Lead module 12 then begins pulling trailing module 13 into the straight section of pipe.

After a short distance, trailing idler 14 contacts the surface of the inside wall of the turn and guides trailing module 13 into the straight section of pipe. As the trailing module 13 enters the straight section, the drive tires 19 make contact with the inside of the pipe wall and the turn sequence is complete. Steel wire springs at the pivot connection (not shown) may be used as compliant members to prevent module overtravel during cornering maneuvers.

Robotic pipe crawling device 10 is capable of three degrees of freedom, of which some are "driven", some are "free" and some are "constrained". The "driven" degree of freedom is accomplished by the drive wheels being driven by the aforementioned DC induction motors. This degree of freedom (one per robot module) is that which provides robot movement down the pipe. The "free" degree of freedom is achieved because the modules are free to rotate with respect to the robot chassis. The pivot connection may be prevented from overtravel by two steel wire springs. The "constrained" degree of freedom is achieved because the idler arm connection is constrained at a predetermined angle of 90° with respect to the driveline. At this neutral angle, the module can "flip-flop" as in the cornering maneuver and achieve equal traction regardless of which side of the pipe centerline the idler is on.

ANOTHER EMBODIMENT

Having described a first embodiment shown in simplified form for an understanding of the basic features of the invention and its operation, a second embodiment having the same basic principles of operation and additional features will be described and shown in more detail with reference to FIGS. 5–17.

The mechanical configuration of the second embodiment is a refinement of the previously described device. Components previously described with reference to FIGS. 1–4 are given the same numerals of reference. The overall configuration of the second embodiment is substantially similar to that previously described and retains the expandable structure necessary for adaptation to changes in pipe diameter. The second embodiment also has the large idler wheel stance to drive wheel stance ratio which provides rotational stability about its longitudinal axis and minimizes the need for periodic adjustment of the robot roll orientation.

One of the significant features of the second embodiment is the implementation of a swivel or waist joint in the robots chassis giving it the capability to rotate one module with respect to the other about the robot longitudinal axis which is essential for negotiation of arbitrarily oriented turns. The first described embodiment is capable of operating in one plane. The second embodiment also provides an active pipe wall gripping/releasing feature as described hereinafter.

Referring to FIGS. 5–11, there is shown a second embodiment of a robotic pipe crawling device 30 inside a pipe P. Robotic crawling device 30 comprises a two-piece center chassis 31 with a lead drive module 32 pivotally connected to the forward end, and a trailing drive module 33 pivotally connected to the rearward end.

The two-piece chassis 31 has a short cylindrical swivel or waist joint 132 at its center. Waist joint 132 (FIG. 9) comprises a first or forward bearing housing 133, one end of which is a hollow square frame configuration and the other end is a cylindrical configuration 34 with exterior threads 35 with a central bore 36.

Figures 7, 8, 9, 10:
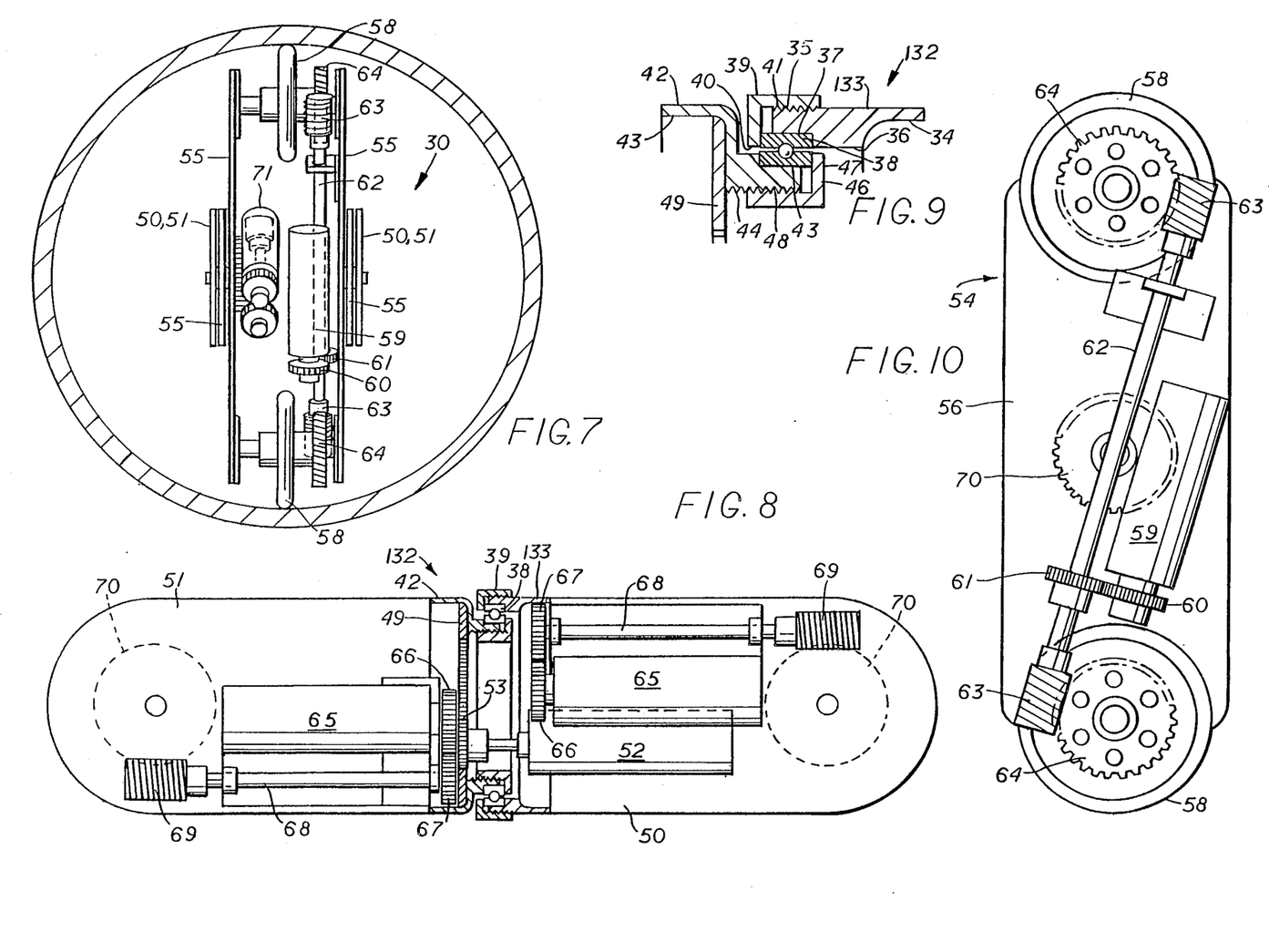
FIG. 7 is a sectional view of a pipe showing and end view of the robotic pipe crawling device as shown in FIG. 5.
FIG. 8 is a view detailing the waist joint and module pivot mechanisms of the robotic pipe crawling device of FIG. 5.
FIG. 9 is a slightly enlarged detail view of the articulated waist joint connection shown in FIG. 8.
FIG. 10 is a side view, with outer plate removed, showing the positioning and connection of the propulsion motors within the driveline yoke.

The cylindrical end is counterbored at 37 to receive the exterior of a bearing 38. A cylindrical outer bearing cap 39 with a central bore 40 and an internally threaded portion 41 defining a shoulder therebetween is threadedly received on the threaded cylindrical end 35 of housing 33 to retain bearing 38 in counterbore 37.

The other half of waist joint 132 comprises a second or aft bearing housing 42, one end of which is a hollow square frame configuration and the other end is a cylindrical configuration with interior threads. The exterior of the cylindrical end has a reduced diameter portion 45 to receive the interior diameter of the bearing 38. A cylindrical inner bearing cap 46 having a circumferential flange 47 and an externally threaded portion defining a shoulder therebetween is threadedly received on the threaded cylindrical end 44 of housing 42 to retain bearing 38 on reduced diameter 43. A flat internal ring gear 49 is secured to the aft bearing housing within the square end 43.

A pair of parallel laterally spaced rectangular side plates 50 are pinned at one end to opposite sides of square end 34 of forward bearing housing 33. Another pair of parallel laterally spaced rectangular side plates 51 are pinned at one end to opposite sides of square end 34 of aft bearing housing 42.

A rotation drive motor 52 (FIG. 8), such as a permanent magnet DC induction motor equipped with a quadrature sensing encoder, is mounted on a motor mount plate to one of the side plates 50 of the forward portion of chassis 31. A spur gear 53 is secured to the output shaft of motor 52 in engagement with ring gear 49 to rotate the forward and aft halves of the chassis and attached drive modules 32 and 33 about the longitudinal axis relative to one another as explained hereinafter. The waist joint rotational motion can range approximately $+/-90°$ from the nominal straight traverse position.

Figure 5:
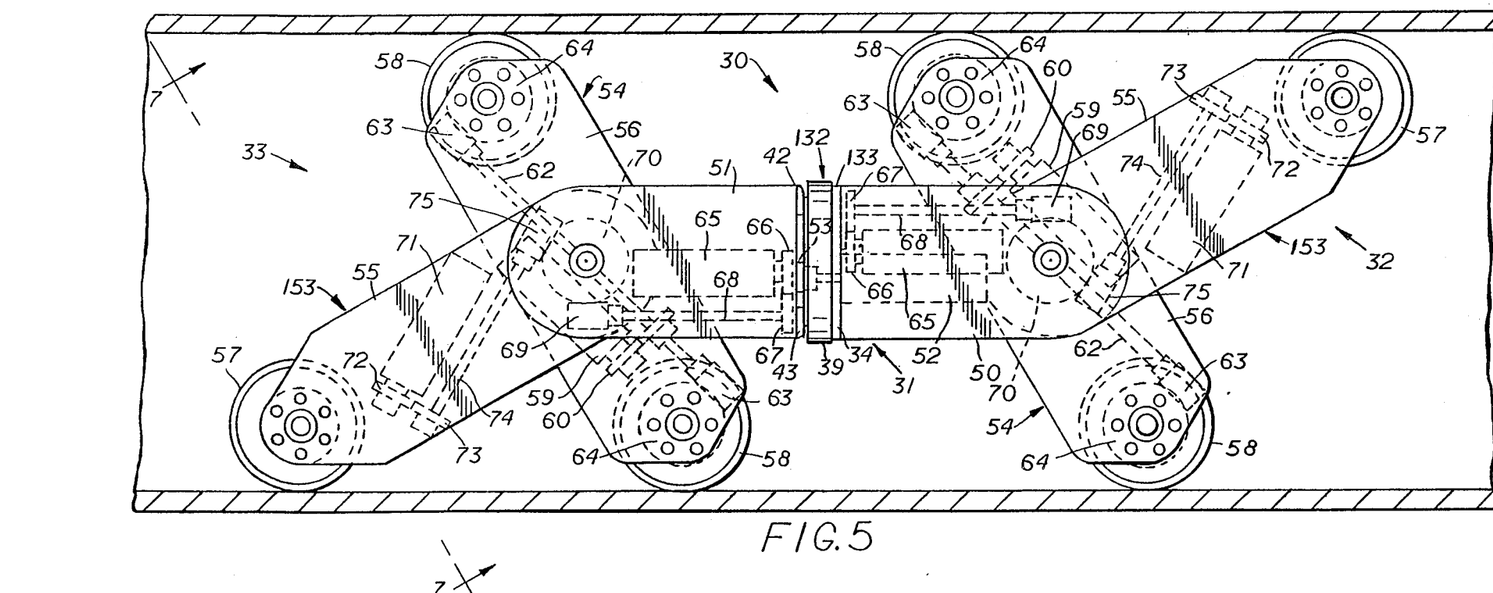
FIG. 5 is a side elevation of another embodiment of the robotic pipe crawling device of FIG. 1 showing full details of the positioning and connection of the operating motors.
Figure 6:
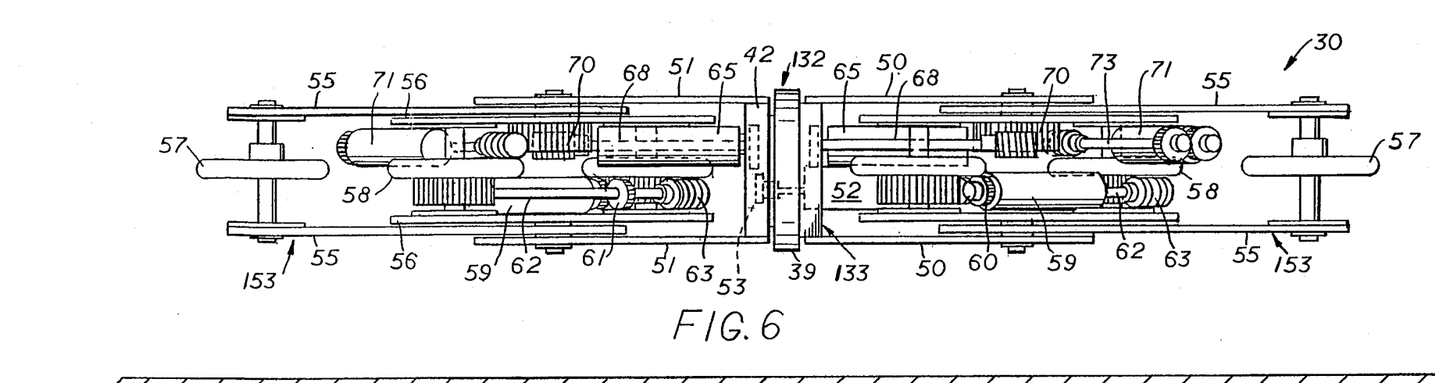
FIG. 6 is a top plan view of the robotic pipe crawling device as shown in FIG. 5.

Drive modules 32 and 33 each comprise an idler yoke 153 and a driveline yoke 54 formed of parallel laterally spaced rectangular side plates 55 and 56, respectively. Idler side plates 55 are pinned at one end, and the driveline side plates 56 are pinned intermediate their ends, to the outer ends of the center chassis side plates 50 and 51. An idler wheel 57 is rotatably mounted on an axle at the outer end of each idler yoke 153 and a pair of driveline wheels 58 are mounted on axles one at each end of driveline yoke 54. Idler yoke 153 and the driveline yoke 54 pivot independently of each other about the axis of the pivot connections near the ends of the chassis 31.

Figures 11, 12:
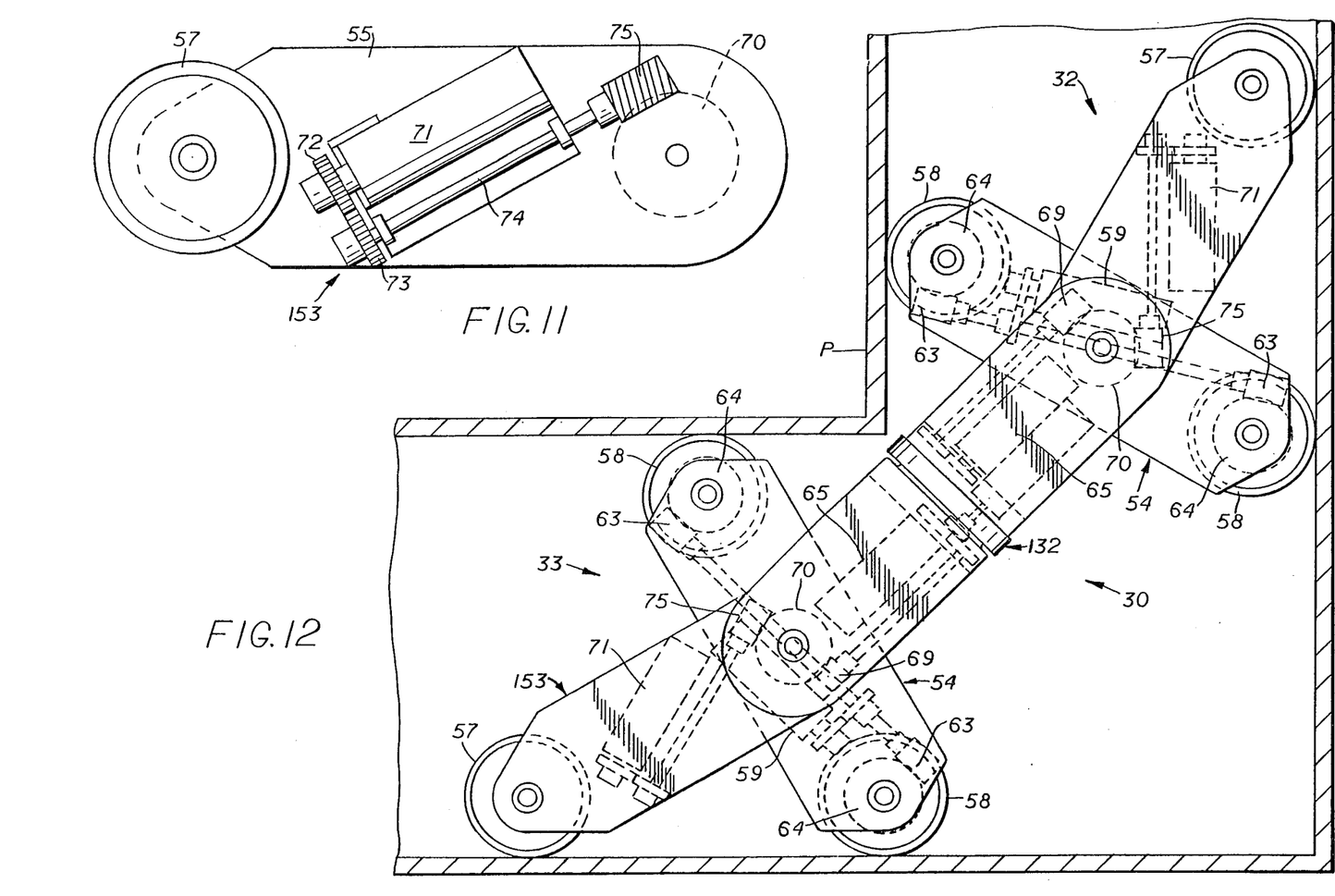
FIG. 11 is a side view, with the outer plate removed showing the positioning and connection of the idler articulation motors within the idler yoke.
FIG. 12 is a view of the robotic pipe crawling device as shown in FIG. 5 negotiating a 90° sharp turn in a pipe.
Figure 13:
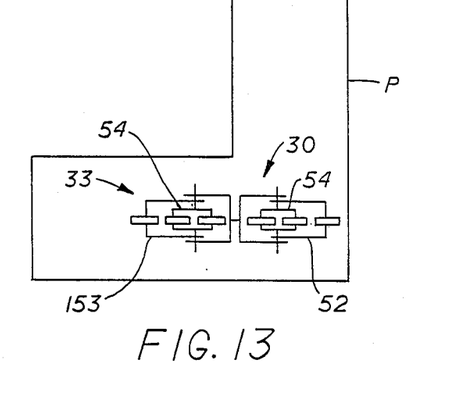
FIGS. 13–17 are successive schematic views of the robotic pipe crawling device in the process of negotiating a 90° turn in a pipe.
Figure 14:
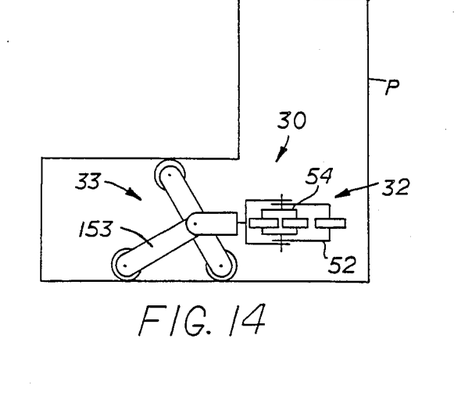
Figure 15:
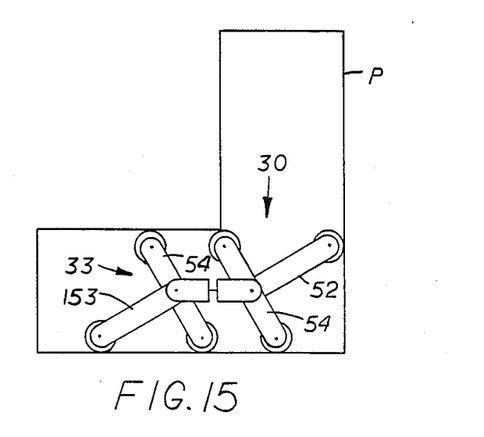
Figure 16:
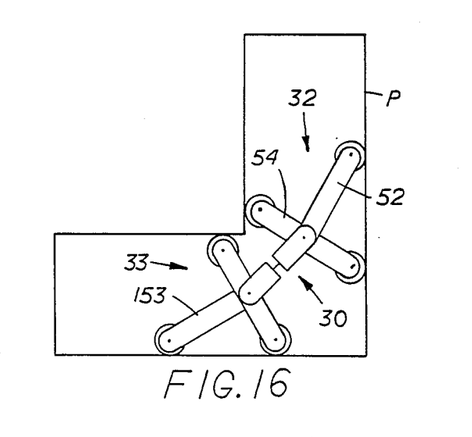
Figure 17:
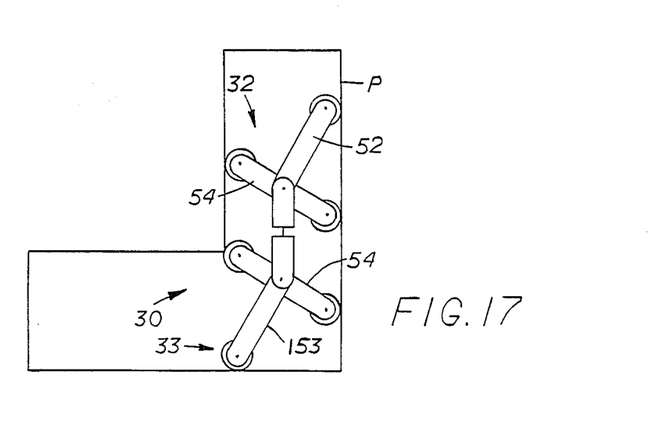

FIGS. 8, 10 and 11 illustrate the robot with one outer side plate of the yokes removed to show the internal configuration of the device. A drive wheel motor 59 (FIG. 10), such as a permanent magnet DC induction motor equipped with a quadrature sensing encoder, is mounted on a motor mount plate secured to one of the side plates 55 of each half of drive yoke 54.

A spur gear 60 is secured to the output shaft of each motor 59 in engagement with a mating gear 61 on an elongate drive shaft rotatably mounted adjacent the motor with each end extending outwardly from the gears 60 and 61 and has a worm gear 63 at each end operatively connected to a worm wheel or a pinion gear 64 secured to each drive wheel 58. The motor may also incorporate a gear box and/or several stages gearing. The gear ratio is further increased through the use of the worm and pinion wheel set at the robot drive wheels.

A module pivot motor 65 (FIG. 8), such as a permanent magnet DC induction motor equipped with a quadrature sensing encoder, is mounted on a motor mount plate secured to one of the side plates 50 and 51 of each half of chassis 31. A spur gear 66 is secured to the output shaft of each motor 65 in engagement with a mating gear 67 on an elongate shaft 68 rotatably mounted adjacent motor 65. A worm gear 69 is secured to the shaft 68 in engagement with a mating worm wheel or pinion 70 which is secured to one of the side plates 56 of the driveline yoke 54 (FIG. 10). The motor may also incorporate a gear box and/or several stages of gearing. Thus, relative motion between the driveline yokes 54 and the robot chassis 31 results upon rotation of the worm gear. The module pivot can range approximately $+/-40°$ from the nominal straight traverse position.

An idler articulation motor 71 (FIG. 11), such as a permanent magnet DC induction motor equipped with a quadrature sensing encoder, is mounted on a motor mount plate secured to one of the side plates 55 of each idler yoke 153. A spur gear 72 is secured to the output shaft of each motor 71 in engagement with a mating gear 73 on an elongate shaft 74 rotatably mounted adjacent motor 71. A worm gear 75 is secured to output shaft 74 of motor 71 in engagement with worm wheel or pinion 70 which is secured to one of side plates 56 of driveline yoke 54 (FIG. 10).

The motor may also incorporate a gear box and/or several stages of gearing. Thus, relative motion between idler yokes 153 and driveline yokes 54 results upon rotation of worm gear 75. It should be noted that idler yoke 153 positioning is dependent upon the module pivot position, while the module pivot position is independent of the idler yoke position. The idler yoke position can range approximately +/−40° from the nominal straight traverse position. The idler articulation mechanism works in the same way as the module pivot articulation mechanism, and share the same worm wheel or pinion 70 for torque transfer to driveline side plates 56.

Unlike the first described embodiment 10, the robotic pipe crawling device 70 is capable of actively gripping and releasing the pipe wall interior. Gripping of the pipe wall interior is achieved by simultaneously manipulating the idler and module pivot articulation mechanisms to rotate the driveline and idler yoke 54 and 153 in opposite directions such that the leading or trailing module expands against the pipe wall. The robotic device 30 can be made to release from the pipe wall by reversing the above procedure thereby "pinching" the idler and driveline yokes 153 and 54 together and narrowing the module's width. This maneuver can be performed for each of the robot modules separately and independently.

Because the device 30 has a limited capacity for generating large normal forces, tire material having a high coefficient of friction is desired, such polyurethane having a hardness of 70 Durometer. The tire hardness coupled with their thin cross section, solid construction, and solid aluminum wheel, creates a low compliance link between wheel axle and pipe surface which provides more accurate detection of pipe diameter, debris, obstacles, and pipe walls during maneuvers. The polyurethane tire material also provides superior abrasion resistance when used in old pipe which is likely to be rough and abrasive due to scale and corrosion.

The robotic pipe crawling device 30 has seven degrees of freedom. Of the seven degrees of freedom there are four functionally different degrees of freedom; the driveline, pivot, idler, and waist joint movements. The two driveline degrees of freedom have the primary purpose of providing forward and reverse motion to the robot. Secondarily, they assist in accurate placement of the robot idler and module mechanisms during cornering maneuvers.

As discussed above, module pivot articulation relative to the chassis is achieved by driving worm gear 69 with a motor 65 secured to the chassis on the worm wheel or pinion 70 mounted directly to driveline yoke 54. Articulation of the idler yokes 153 relative to the driveline yokes 54 is achieved by driving worm gear 75 on the same worm wheel or pinion 70 secured on the driveline yoke with a motor mounted on the idler yoke. The swivel waist joint 13 provides relative rotation of the fore and aft modules about the robot long axis.

Because of the high gear ratios between the motors and final driven elements, it may be difficult or impossible to backdrive the robot joints. In a general pipe environment where limited knowledge exists regarding the nature of the pipe turns, a "virtual backdrive" feature (not shown) may be beneficial to allow the pipe crawler 30 to follow the pipe path with greater ease. The "virtual backdrive" comprises a strain gage placed on each joint drive-shaft. Each strain gage senses driveshaft axial thrust magnitude and direction. When it becomes desirable for a particular joint to be "backdriveable", the control computer (not shown) simply commands that joint's motor turn until the strain (driveshaft thrust) is null. The end result is that when a joint is placed in the "virtual backdrive" mode, the joint simply responds and follows inputs from the outside world as if it were free to rotate.

OPERATION

During "straight traverse", the active controls maneuver the idler yokes 153d driveline yokes 54 such that the forward and aft modules 32 and 33 expand against the interior of the pipe (see FIGS. 12-17). Once this has been accomplished, the drive motors are turned on and the device 30 begins to travel down the pipe. While not necessary, the up/down relationship between the fore and aft idler yokes 153 is optimum.

At any time during straight traverse the robot may execute a "role sequence" (change orientation about its longitudinal axis). The capability to perform this maneuver is essential for negotiation of arbitrarily oriented pipe bends. To perform this maneuver the robot must first come to a complete stop. Then the forward module 32 is commanded to release its grip on the pipe interior (pivoting the idler and driveline yokes toward one another to narrow the module height).

Once the forward module has completed the release, the waist joint is commanded to rotate the forward module to the desired orientation. Once the forward module has been properly oriented, it is commanded to reestablish its grip on the pipe. After the forward module reestablishes grip, the aft module is commanded to release from the pipe and the waist joint is then commanded to rotate the aft module the same amount and direction as for the forward module. Once this rotation is complete, the aft module reestablishes its grip. At this point the roll sequence is complete and the robot is at rest in it's new orientation. Straight traverse or cornering can then commence.

To execute an "L-cornering sequence", when approaching a 90° corner, it must have previously performed the necessary roll sequence (described above) so that the lead idler yoke is "pointed" in the direction of the approaching turn. With this precondition satisfied, the robot proceeds to the corner until the lead idler tire comes in contact with the inside surface of the outside wall of the impending turn. This contact is sensed by the control software when it detects stall of the two drive motors.

Upon contacting the outside wall, the robot executes a series of predetermined command sequences mathematically derived from the kinematic equations of motion for the robot linkages. This command string is stored on the control computer's hard disk as a human readable ASCII text file. The automatic turn sequence just described is applicable only for 90° turns where precise prior knowledge exists regarding turn characteristics. For negotiating turns of a general nature where limited prior knowledge exists for the pipe interior characteristics, the operator can manually drive the robot through a corner by use of real time motor control. The motion sequence is similar to that which is described with reference to the first embodiment.

The robot 30 is capable of a "T cornering sequence" (negotiating a 90° "T") because of its ability to lift or guide the lead module into openings using the on board motors. As with the "L cornering sequence", the robot must have previously performed the necessary "roll sequence" (above) so that the lead idler is "pointed" in the direction of the approaching "T". With this precondition satisfied, the robot proceeds to the corner until the lead idler is adjacent to the pipe "T". This condition may be sensed by observation, or CCD cameras or feelers may be used to sense position relative to the pipe opening.

The robot then executes a series of predetermined command sequences mathematically derived from the kinematic equations of motion for the robot linkages. This command string is stored on the control computer's hard disk as a human readable ASCII text file. The automatic turn sequence just described is applicable only for 90° "T's" where precise a-priori knowledge exists regarding turn characteristics. In negotiating turns of a general nature where limited prior knowledge exists for the pipe interior characteristics, the operator can manually drive the robot through a corner by use of real time motor control.

The robot can perform a "Y cornering sequence" (negotiating a "Y") because of its ability to lift or guide the lead module into openings using the on board motors. As with the "L" and "T" cornering maneuvers, the robot must have previously performed the necessary roll sequence so that the lead idler is "pointed" in the direction of the desired path of the approaching "Y". With this precondition satisfied, the robot proceeds to the corner until the lead is adjacent to the pipe "Y". This condition may be sensed by observation, or cameras or feelers may be used to sense position relative to the pipe opening.

The robot then executes a series of predetermined command sequences mathematically derived from the kinematic equations of motion for the robot linkages. This command string is stored on the control computer's hard disk as a human readable ASCII text file. The automatic turn sequence just described is applicable only for "Y's" where precise a-priori knowledge exists regarding its internal characteristics. To negotiate turns of a general nature where limited prior knowledge exists for the pipe interior characteristics, the operator can manually drive the robot through a corner by use of real time motor control.

In carrying out the above described maneuvers, conventional electronic control boards may be utilized which are run on a suitable microcomputer and operated through created software front end applications, such as discussed below. The operator may perform manual "point to point" positioning of a particular degree of freedom by simply specifying the degree of freedom and the amount of rotation or translation desired. The operator can also manually specify torque limits for each of the seven axes. This minimizes the potential for robot damage during development testing, execution of untried maneuvers, or route learning. By counting encoder pulses from the two drive motors, the front end can track the distance traversed by the robot. This rudimentary odometer does not take into account wheel slippage nor periods of motion without wheel rotation such as during module lift into a pipe "T".

Perhaps the most significant capability of the software is the capability "learn" a series of axis control sequences. When in the learn mode, the robot operator manually commands the robot through a series of maneuvers. During this time the computer records the set of command sequences in a human readable/editable ASCII text file. Later on, this set of commands can be replayed or edited so as to remove any unnecessary, extraneous, or inappropriate moves.

Because of its modular construction the robotic pipe crawling device allows expedient assembly, removal, and replacement of damaged or worn parts. Each module can be remove without dismantling the entire device and the center or body section can be removed from the modules without their disassembly. This speeds both assembly and repair work. The modular construction also provides extendibility. In other words, since the construction is formed primarily from wheeled modules connected with side plates, the robot device can be extended by adding additional motorless or motorized driveline modules between the two end modules. The only requirement is that the distance between motorless driveline modules be proportional to the pipe I.D.. for example, six inches for six inch I.D. pipe. Theoretically, the there is no limit to the number of modules that could be added. This feature provides additional room to carry electronics, sensors, batteries, tether, and other apparatus.

The robotic pipe crawling device is capable of being adapted to changes in pipe diameter of approximately $+/-10\%$. It should be understood that the addition of knee joints to the module yokes will increase the range of pipe sizes that can be traversed. The addition of telescoping module yokes is also another may of achieving greater pipe diameter adaptability.

While this invention has been described fully and completely with special emphasis upon preferred embodiments, it should be understood that within the scope of the appended claims the invention may be practiced otherwise than as specifically described herein.

We claim:

1. A self-propelled vehicle for movement along the interior surface of a pipe comprising;
    a wheeled lead module and a wheeled trailing module pivotally to form a linearly articulated structure,
    each wheeled module having one idler wheel and two drive wheels adapted for rolling engagement with the interior surface of the pipe,
    each of said wheeled modules being pivotable independently into and out of a wheel engaging position on the interior surface of the pipe,
    motor means carried for driving said drive wheels to move said vehicle linearly inside a pipe, and
    said idler wheels being operative to track the interior surface of the pipe ahead of and behind said modules to guide said vehicle around turns in the pipe.

2. A self-propelled vehicle according to claim 1 including
    a longitudinal chassis with said modules pivotally connected on opposite ends thereof, and
    means for securing said drive wheels at a position relative to said chassis to engage the interior surface of said pipe with sufficient pressure to assure adequate frictional contact with said interior surface for moving said vehicle inside the pipe.

3. A self-propelled vehicle according to claim 2 in which
    said chassis is of a non-articulated construction and maintains said modules in a fixed orientation relative to each other.

4. A self-propelled vehicle according to claim 2 in which said motor means carried by said chassis and rotates said two drive wheels in opposite directions.

5. A self-propelled vehicle according to claim 2 in which
each said module comprise a generally rectangular driveline yoke pivotally connected intermediate its ends to one end of said chassis for pivotal movement relative thereto and said drive wheels rotatably mounted one at each end of the driveline yoke, and
an idler yoke pivotally connected at one end to one end of said chassis and said idler wheel rotatably mounted at the opposite end of the idler yoke.

6. A self-propelled vehicle according to claim 5 in which
said drive wheels each have a drive gear operatively secured thereto,
said motor means comprises a drive motor mounted within said driveline yoke and having an output shaft with a gear thereon operatively engaging said drive gear to rotate said drive wheels in opposite directions.

7. A self-propelled vehicle according to claim 6 in which
said motor is a reversible motor operative to move said vehicle into or out of said pipe.

8. A self-propelled vehicle according to claim 6 including
an elongate rod rotatably mounted within said driveline yoke and operatively connected to said drive motor to be rotated thereby,
a gear secured at each end of said rod and operatively engaged with a mating gear secured on each drive wheel such that said drive wheels will rotate in opposite direction upon operation of said drive motor.

9. A self-propelled vehicle according to claim 8 in which
said gear at each end of said elongate rod comprises a worm gear, and
said worm gear is operatively engaged with a worm wheel gear secured to each said drive wheel.

10. A self-propelled vehicle according to claim 8 in which
said drive motor is operatively connected to said elongate rod through a gearbox.

11. A self-propelled vehicle according to claim 5 in which
said idler yoke is adjustably secured to said driveline yoke at selective angles for pivotal movement therewith.

12. A self-propelled vehicle according to claim 5 in which
said idler yoke is pivotally connected to said chassis for pivotal movement relative to said driveline yoke.

13. A self-propelled vehicle according to claim 5 in which
said driveline yoke and said idler yoke are each formed of parallel laterally spaced rectangular plate members defining side walls thereof.

14. A self-propelled vehicle according to claim 5 in which
said chassis, said driveline yoke and said driveline yoke each formed of parallel laterally spaced rectangular plate members defining side walls thereof.

15. A self-propelled vehicle according to claim 5 in which
said drive wheels and said idler wheel have tires constructed of material having a low coefficient of friction, and low stiffness.

16. A self-propelled vehicle according to claim 5 in which
said drive wheels and said idler wheel have tires constructed of material having a high coefficient of friction, high abrasion resistance, and high stiffness.

17. A self-propelled vehicle according to claim 5 in which
the axial distance from the pivot connection to the axis of said idler wheel is greater than the axial distance between the axis of the said drive wheels such that the idler wheel stance is greater than the drive wheel stance in the wheel engaged position to reduce the tendency of the vehicle to corkscrew when traversing the pipe.

18. A self-propelled vehicle according to claim 1 including
a longitudinal chassis with said modules pivotally connected on opposite ends thereof,
said motor means being carried by said chassis for rotatably driving said two drive wheels in opposite directions, and
second motor means carried by said chassis for pivoting said wheeled modules independently into and out of a wheel engaging position on the interior surface of the pipe.

19. A self-propelled vehicle according to claim 18 in which
said second motor means comprises a pivot motor mounted within said chassis and having an output shaft with a drive gear thereon, and
a gear secured at the' pivotal connection of each said module and operatively engaged with said pivot motor drive gear whereby said wheeled modules may be pivoted independently into and out of a wheel engaging position on the interior surface of the pipe upon operation of said pivot motor.

20. A self-propelled vehicle according to claim 19 in which
said drive gear on the output shaft of said pivot motor comprises a worm gear, and
said worm gear is operatively engaged with a worm wheel gear secured to each wheeled module about its pivot connection.

21. A self-propelled vehicle according to claim 19 in which
said pivot motor is operatively connected to said gear secured at the pivotal connection through a gearbox.

22. A self-propelled vehicle according to claim 18 in which
each said module comprise a generally rectangular driveline yoke pivotally connected intermediate its ends to one end of said chassis for pivotal movement relative thereto and said drive wheels rotatably mounted one at each end of the driveline yoke, and
an idler yoke pivotally connected at one end to one end of said chassis and said idler wheel rotatably mounted at the opposite end of the idler yoke.

23. A self-propelled vehicle according to claim 22 in which
said second motor means comprises a drive motor mounted within said driveline yoke and having a drive gear on its output shaft, an elongate rod rotatably mounted within said driveline yoke and operatively connected to said drive motor to be rotated thereby, a gear secured at each end of said rod and operatively engaged with a mating gear secured on each drive wheel such that said drive wheels will rotate in opposite direction upon operation of said drive motor.

24. A self-propelled vehicle according to claim 23 in which said gear at each end of said elongate rod comprises a worm gear, and said worm gear is operatively engaged with a worm wheel gear secured to each said drive wheel.

25. A self-propelled vehicle according to claim 23 in which said drive motor is operatively connected to said elongate rod through a gearbox.

26. A self-propelled vehicle according to claim 22 said idler yoke is adjustably secured to said driveline yoke at selective angles for pivotal movement therewith.

27. A self-propelled vehicle according to claim 22 in which said idler yoke is pivotally connected to said chassis for pivotal movement relative to said driveline yoke.

28. A self-propelled vehicle according to claim 27 in which said second motor means comprises a first pivot motor mounted within said chassis and having a drive gear on its output shaft, a gear secured at the pivotal connection of each said driveline yoke and operatively engaged with said pivot motor drive gear such that each driveline yoke will pivot independently into and out of a wheel engaging position on the interior surface of the pipe upon operation of said pivot motor, and a second pivot motor mounted within said idler yoke and having a drive gear on its output shaft operatively engaged with said gear at the pivotal connection of driveline yoke such that each idler yoke will pivot independently of said driveline yoke into and out of a wheel engaging position on the interior surface of the pipe upon operation of the second pivot motor.

29. A self-propelled vehicle according to claim 28 in which said drive gear on the output shaft of said first and second pivot motors comprise worm gears, and said worm gears are operatively engaged with a worm wheel gear secured to each driveline yoke about its pivot connection.

30. A self-propelled vehicle according to claim 28 in which said pivot motors are operatively connected to said gear secured at the pivotal connection through a gearbox.

31. A self-propelled vehicle according to claim 18 including;

a swivel joint in said chassis intermediate the opposite ends to form a forward chassis section and a rearward chassis section whereby the forward and rearward chassis sections are capable of rotation about the longitudinal chassis axis relative to one another, and third motor means carried by said chassis for rotating said forward and rearward chassis sections about the longitudinal chassis axis relative to one another.

32. A self-propelled vehicle according to claim 31 in which said third motor means comprises a rotation motor mounted within one of said chassis section adjacent the swivel connection and having an output shaft extending through said swivel connection with a drive gear on the output shaft, a gear secured in the other one of said chassis sections adjacent said swivel connection and operatively engaged with said rotation motor drive gear such that each chassis section will rotate about the chassis longitudinal axis relative to one another upon operation of said rotation motor.

33. A self-propelled vehicle according to claim 31 in which said drive gear on the output shaft of said rotation motor comprises a spur gear, and said spur gear is operatively engaged with a ring gear secured to said other chassis section.

34. A self-propelled vehicle according to claim 31 in which said rotation motor is operatively connected to said gear secured to said other chassis section through a gearbox.

35. A self-propelled vehicle according to claim 18 in which said chassis comprises a generally rectangular open frame member.

36. A self-propelled vehicle according to claim 18 in which said driveline yoke and said idler yoke are each formed of parallel laterally spaced rectangular plate members defining side walls thereof.

37. A self-propelled vehicle according to claim 18 in which said chassis, said driveline yoke and said driveline yoke each formed of parallel laterally spaced rectangular plate members defining side walls thereof.

38. A self-propelled vehicle according to claim 18 in which said drive wheels and idler wheel have tires constructed of material having a low coefficient of friction.

39. A self-propelled vehicle according to claim 18 in which said drive wheels and said idler wheel have tires constructed of material having a high coefficient of friction.

40. A self-propelled vehicle according to claim 18 in which the axial distance from the pivot connection to the axis of said idler wheel is greater than the axial distance between the axis of the said drive wheels such that the idler wheel stance is greater than the drive wheel stance in the wheel engaged position to reduce the tendency of the vehicle to corkscrew when traversing the pipe.

* * * * *